(12) United States Patent
Bolzacchini

(10) Patent No.: US 7,987,773 B2
(45) Date of Patent: Aug. 2, 2011

(54) CHURN FOR PROCESSING FOOD PRODUCTS

(75) Inventor: Giovanni Bolzacchini, Solarolo di Goito (IT)

(73) Assignee: Inox Meccanica S.R.L., Solarolo di Goito (IT)

( * ) Notice: Subject to any disclaimer, the term of this patent is extended or adjusted under 35 U.S.C. 154(b) by 834 days.

(21) Appl. No.: 12/068,130

(22) Filed: Feb. 4, 2008

(65) Prior Publication Data
US 2008/0236408 A1 Oct. 2, 2008

(30) Foreign Application Priority Data
Mar. 30, 2007 (IT) .............................. MN2007A0009

(51) Int. Cl.
*A22C 9/00* (2006.01)
(52) U.S. Cl. .............. 99/345; 99/348; 366/57; 366/185; 366/220; 452/141
(58) Field of Classification Search .................... 99/535, 99/532, 348, 345, 407; 366/57, 220, 185; 69/30; 68/58, 142; 220/253, 373, 374, 601; 222/631, 528, 529, 531, 545, 546, 544, 556; 452/141
See application file for complete search history.

(56) References Cited

U.S. PATENT DOCUMENTS

| | | | | |
|---|---|---|---|---|
| 2,776,070 A | * | 1/1957 | Phillips | 220/203.11 |
| 3,402,918 A | * | 9/1968 | Soulier | 366/192 |
| 3,665,735 A | | 5/1972 | Brennan | |
| 3,699,786 A | * | 10/1972 | Rencher | 68/144 |
| 4,657,771 A | | 4/1987 | Gould | |
| 4,791,705 A | * | 12/1988 | Corominas | 452/141 |
| 6,595,846 B1 | * | 7/2003 | Lagares Corominas | 452/141 |
| 7,024,988 B2 | * | 4/2006 | Corominas | 99/532 |

FOREIGN PATENT DOCUMENTS
EP 1 645 190 A 4/2006
FR 2 673 994 A 9/1992

* cited by examiner

*Primary Examiner* — Reginald L Alexander
(74) *Attorney, Agent, or Firm* — Modiano & Associati; Albert Josif; Daniel O'Byrne

(57) ABSTRACT

A churn for processing food products, comprising a rotating drum with an opening for loading and unloading the products, further comprising a hatch provided with elements for detachable coupling to the opening of the drum and comprising ports adapted to allow the outflow of water deposited on the bottom of the drum, elements being provided which are adapted to arrange themselves selectively in a position for opening and closing the ports.

8 Claims, 4 Drawing Sheets

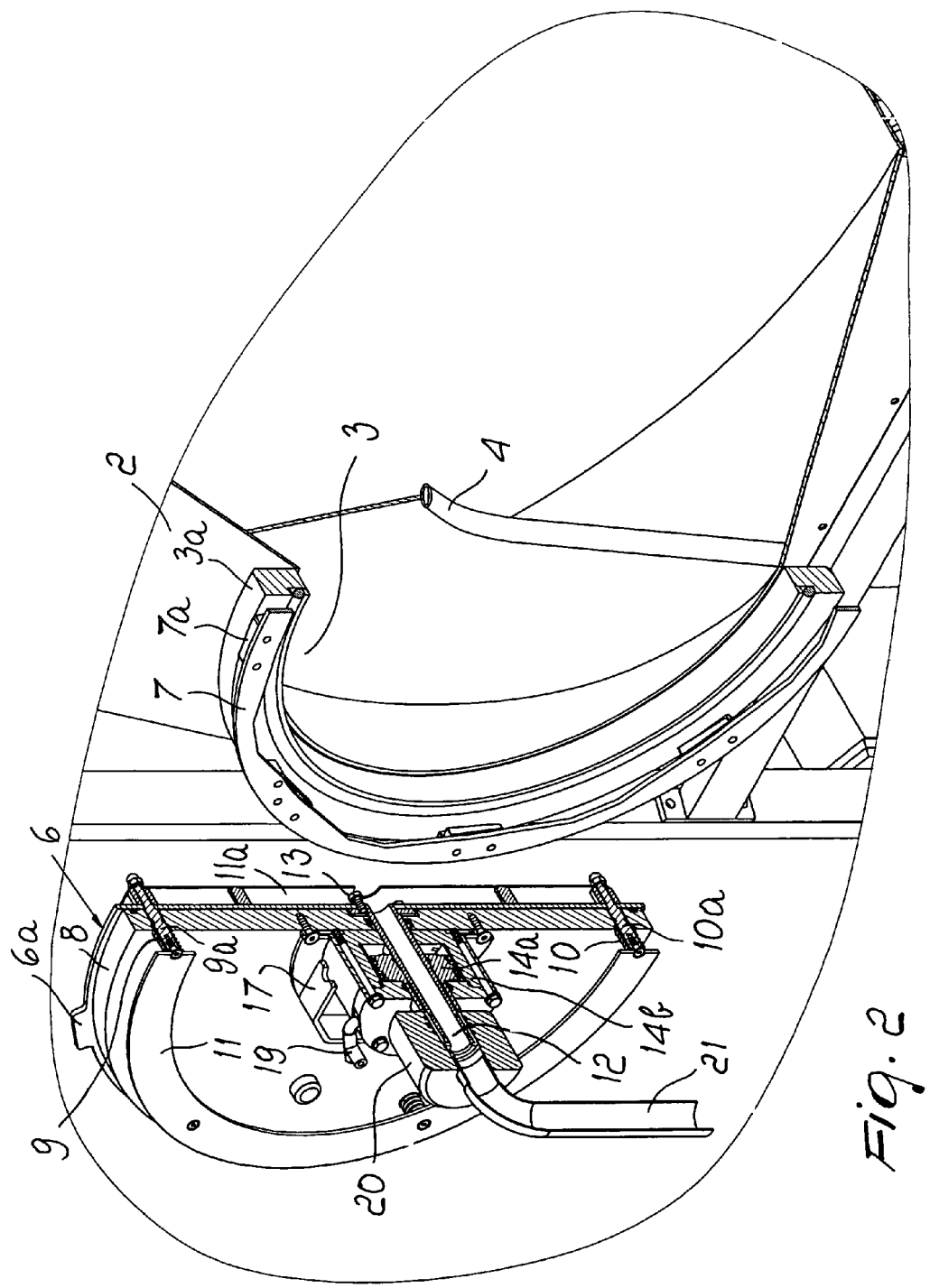

CHURN FOR PROCESSING FOOD PRODUCTS

The present invention relates to an improved churn for processing food products.

BACKGROUND OF THE INVENTION

It is known that in the field of machines for the food industry there are devices known as churns which comprise a rotating drum with an opening for loading and unloading the products to be processed, such as meat or vegetables, which is supported by a footing with variable inclination.

Many operations performed by means of churns generate water, which deposits on the bottom of the drum and must be eliminated in order to be able to continue processing of the products.

SUMMARY OF THE INVENTION

The aim of the present invention is to provide a churn which allows to eliminate the water deposited on the bottom of the drum rapidly and in conditions of great convenience in operation.

This aim is achieved by an improved churn for processing food products, according to the invention, comprising a rotating drum with an opening for loading and unloading the products, the opening being supported by an appropriately provided footing with variable inclination, characterized in that it comprises a hatch provided with means for detachable coupling to the opening of the drum and comprising ports adapted to allow the outflow of water deposited on the bottom of said drum, means being provided which are adapted to arrange themselves selectively in a position for opening and closing said ports.

BRIEF DESCRIPTION OF THE DRAWINGS

Further characteristics and advantages of the present invention will become better apparent from the description of a preferred but not exclusive embodiment thereof, illustrated by way of non-limiting example in the accompanying drawings, wherein:

FIG. 2 is a perspective view of a detail of FIG. 1, with the hatch open;

DESCRIPTION OF THE PREFERRED EMBODIMENTS

Figure 1:
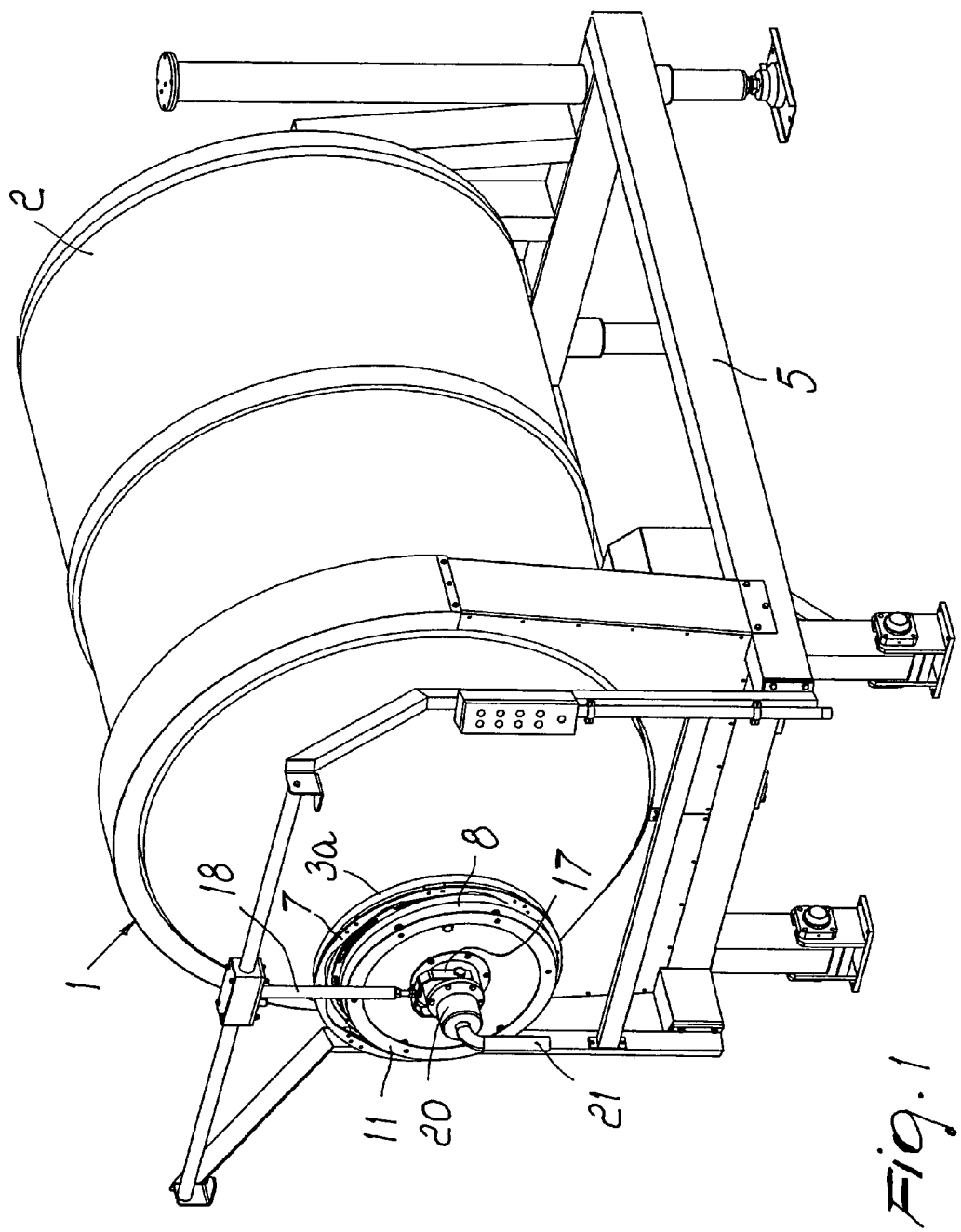
FIG. 1 is a perspective view of the churn according to the invention, in the operating position, with the hatch closed.

With reference to the Figures, the reference numeral 1 generally designates a churn, which comprises a rotating drum 2 with a loading and unloading opening 3 and provided internally with a blade 4 which is supported by a footing 5 with variable inclination.

The churn according to the invention comprises a hatch 6, which is provided with means for detachable coupling to the opening 3 of the drum in order to close such opening which are now described in detail.

Such means thus comprise a ring 3a, which is welded onto the perimeter of the opening 3, and an appropriately contoured complementary ring 7, which is fixed to the ring 3a by means of spacers 7a; the hatch 6 is provided with peripheral protrusions 6a, which are ramp-shaped and are adapted to be inserted, by utilizing the appropriately provided contoured portions of the complementary ring 7, in the portion of space comprised between the complementary ring 7 and the ring 3a, and to come into contact with the spacers 7a at the ramps, so as to lock by friction the hatch as a consequence of the progressive rotation thereof about its own axis.

The hatch 6 is provided with ports 6b, which are adapted to allow the outflow of water deposited on the bottom of the drum 2, such ports being distributed along the entire circumference in order to allow random positioning of the hatch, and there are means, now described in detail, which are adapted to arrange themselves selectively in the position for opening and closing the ports.

Figure 4:
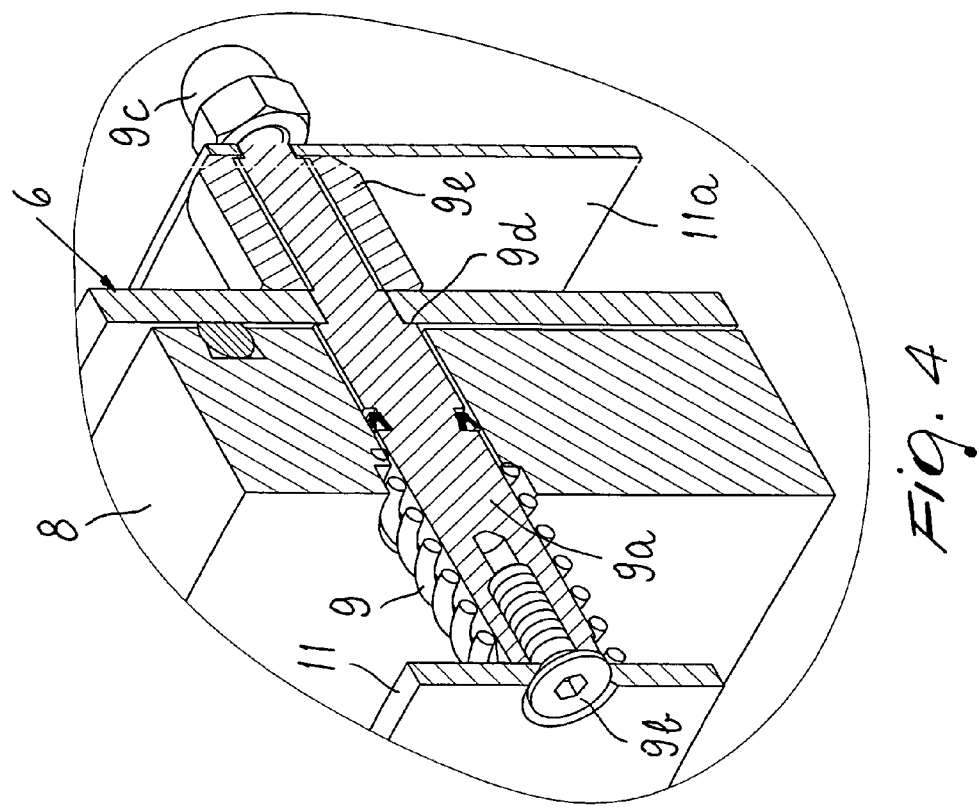
FIG. 4 is a perspective view of a detail of FIG. 2.
Figure 3:
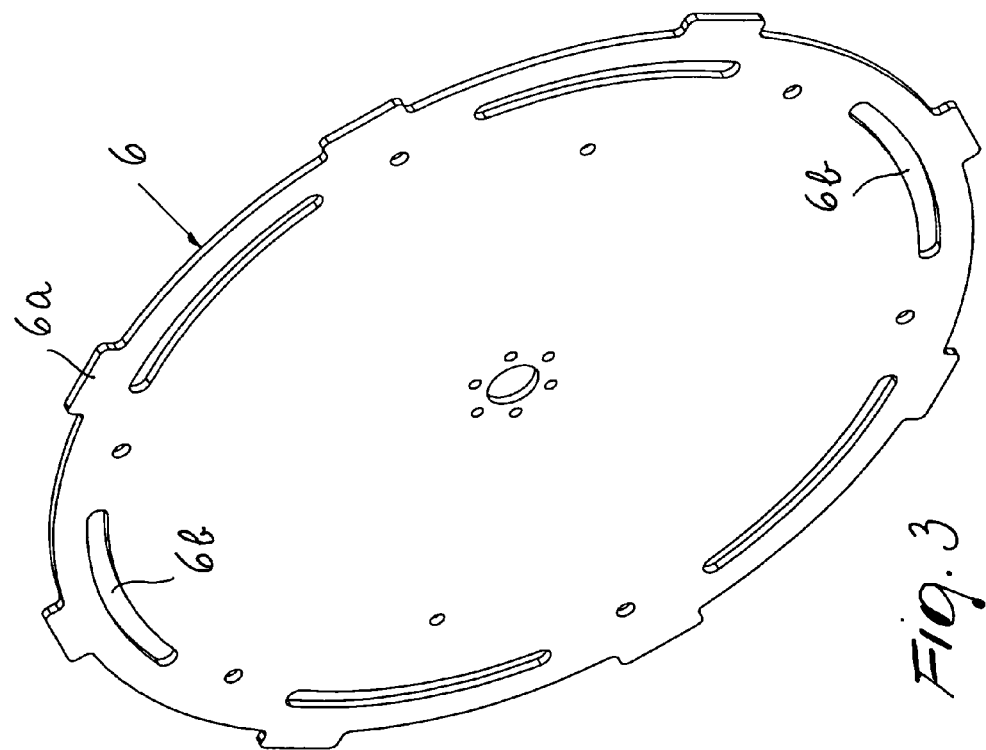
FIG. 3 is a perspective view of the hatch.
Figure 5:
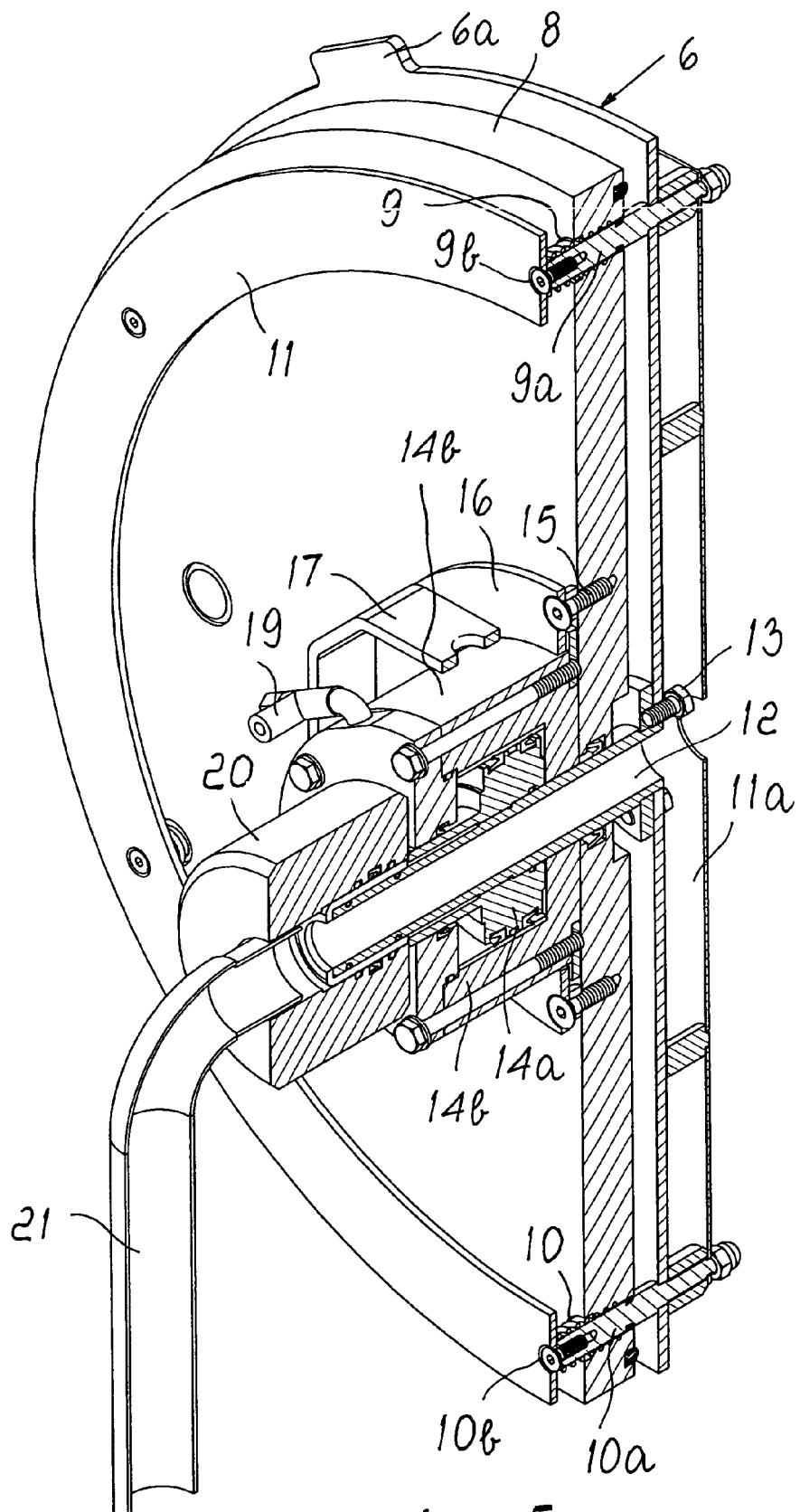
FIG. 5 is a perspective view of a detail of FIG. 2 in a different operating condition.

Such means thus comprise a disk 8, which is provided with means for movement between the position in which it adheres to the hatch 6 and therefore closes the ports 6b, position shown in FIGS. 2 and 4, and the position in which it is spaced from the hatch, and therefore opens the ports 6b, position shown in FIG. 5.

In particular, the movement means comprise a plurality of springs 9 and 10, which are designed to keep the disk 8 in contact with the hatch 6 by acting by contrast against a single ring 11, and are supported by stems 9a, 10a, with which the ring 11 is associated at one end by means of screws 9b, 10b.

The stems 9a, see in particular FIG. 4, are rigidly coupled to the hatch 6 by means of nuts 9c by way of the contrast provided by abutments 9d and by way of the presence of spacers 9e, which perform the dual function of centering the hatch 6 on the ring 3a and of arranging at the correct distance from the hatch a partition 11a supported by the stems 9a and 10a, which is designed to keep the products contained in the drum at such a distance from the internal surface of the hatch as to provide assurance against any jamming of the ports 6b provided in the hatch.

The separation of the disk 8 from the hatch 6, with a sliding motion along a sleeve 12 rigidly associated with the hatch 6 by means of screws 13 from the position shown in FIGS. 2 and 4, which is maintained as mentioned by means of the springs 9 and 10, to the position shown in FIG. 5, is provided by overcoming the action of such springs with the single-acting actuation cylinder which comprises a piston 14a, which is fixed, since it is rigidly coupled to the sleeve 12, and an outer jacket 14b, which is rigidly coupled to the disk 8 by means of screws 15, which fix a ring 16 capable indeed of retaining the jacket; the reference numeral 17 further designates a bracket which is fixed to the outer jacket and is connected, according to what is shown in FIG. 1, to supporting elements 18, and the reference numeral 19 designates a coupling provided on the outer jacket for connection to a compressed air line.

Finally, it should be noted that the sleeve 12 has an end which is open toward the inside of the drum 2, while the other end is connected by means of a hub 20 to a line 21 for generating vacuum in the drum.

The described invention is susceptible of numerous modifications and variations, all of which are within the scope of the appended claims; all the details may further be replaced with other technically equivalent elements.

The disclosures in Italian Patent Application no. MN2007A000009, from which this application claims priority, are incorporated herein by reference.

What is claimed is:

1. A churn for processing food products, comprising a rotating drum with an opening for loading and unloading products, said drum being supported by a footing with variable inclination, further comprising a hatch provided with means for detachable coupling to the opening of the drum, said hatch comprising ports adapted to allow the outflow of water deposited on the bottom of said drum, means being provided which are adapted to arrange themselves selectively in a position for opening and closing said ports, the means adapted to arrange themselves selectively in the position for opening and closing the ports provided in the hatch comprise a disk provided with means for movement between a position for spacing from the hatch and a position in which said disk adheres to said hatch.

2. The churn according to claim 1, wherein said disk is provided with springs which are adapted to keep said disk in a position in which it adheres to the hatch, and with an actuation cylinder which is adapted to move said disk into a position in which it is spaced from the hatch, overcoming the action of said springs.

3. The churn according to claim 2, wherein the springs designed to keep the disk in a position in which it adheres to the hatch are supported by stems which are rigidly coupled to said hatch and act by contrast against a single ring with which the ends of all the stems are associated, a partition being associated with said stems at the internal surface of the hatch with interposition of spacers adapted to center said hatch on the ring which is rigidly coupled to the perimeter of the opening of the drum.

4. The churn according to claim 1, further comprising a sleeve which protrudes integrally from an outer surface of the batch and is adapted to support slidingly the disk in its movements between the positions respectively for separation from the hatch and for contact therewith, a piston of a single-acting actuation cylinder being integrally associated with said sleeve, with an active face opposite the one directed toward said disk, an outer jacket of said actuation cylinder being rigidly coupled to said disk.

5. The churn according to claim 4, wherein the outer jacket of the actuation cylinder is provided with a bracket which is connected to elements for supporting the assembly that comprises the hatch.

6. The churn according to claim 4, wherein the sleeve that protrudes integrally from the outer surface of the hatch is open at one end toward the inside of the drum and is adapted to be connected at an other end to a vacuum generation line.

7. A churn for processing food products, comprising a rotating drum with an opening for loading and unloading products, said drum being supported by a footing with variable inclination, further comprising a hatch provided with means for detachable coupling to the opening of the drum, said hatch comprising ports adapted to allow the outflow of water deposited on the bottom of said drum, means being provided which are adapted to arrange themselves selectively in a position for opening and closing said ports, the churn further comprising a partition which is fixed at a distance from a surface of the hatch that is directed toward the inside of the drum and is adapted to keep the products contained in the drum at a distance from said surface such as to avoid jamming of the ports provided in the hatch.

8. A churn for processing food products, comprising a rotating drum with an opening for loading and unloading products, said drum being supported by a footing with variable inclination, further comprising a hatch provided with means for detachable coupling to the opening of the drum, said hatch comprising ports adapted to allow the outflow of water deposited on the bottom of said drum, means being provided which are adapted to arrange themselves selectively in a position for opening and closing said ports, wherein the means for detachable coupling of the hatch to the opening of the drum comprise a ring which is rigidly coupled to a perimeter of said opening and a complementary ring which is fixed to said ring by means of spacers, said hatch being provided with peripheral protrusions which are ramp-shaped and are adapted to enter a portion of space comprised between the ring and the complementary ring and to come into contact with the spacers at the ramps in order to lock the hatch by friction as a consequence of progressive rotation of said hatch about an axis thereof.

* * * * *